United States Patent [19]
Biais

[11] Patent Number: 5,793,178
[45] Date of Patent: Aug. 11, 1998

[54] SYNCHRONOUS PERMANENT-MAGNET ELECTRIC MOTOR AND VEHICLE DRIVEN BY SUCH A MOTOR

[75] Inventor: François Biais, Chatou, France

[73] Assignee: Thomson-CSF, Paris, France

[21] Appl. No.: 778,821

[22] Filed: Jan. 3, 1997

[30] Foreign Application Priority Data

Jan. 4, 1996 [FR] France ................... 96 00044

[51] Int. Cl.$^6$ .................................................. H02P 5/28
[52] U.S. Cl. ................. 318/700; 318/701; 318/720; 318/721
[58] Field of Search ................... 318/800–836, 318/138, 139, 701, 720, 721, 723; 310/201; 420/83, 121, 581; 148/103, 104

[56] References Cited

U.S. PATENT DOCUMENTS

| | | | |
|---|---|---|---|
| 4,387,421 | 6/1983 | Zach et al. | 318/811 |
| 4,423,367 | 12/1983 | Blaschke et al. | 318/803 |
| 4,450,398 | 5/1984 | Bose | 318/803 |
| 4,460,860 | 7/1984 | Schwesig et al. | 318/721 |
| 4,724,373 | 2/1988 | Lipo | 318/805 |
| 4,762,574 | 8/1988 | Ghandehari | 148/103 |
| 4,767,976 | 8/1988 | Mutoh et al. | 318/808 |
| 4,814,677 | 3/1989 | Plunkett . | |
| 4,837,109 | 6/1989 | Tokunaga et al. | 420/83 |
| 4,967,135 | 10/1990 | Ashikaga et al. | 318/808 |
| 5,168,204 | 12/1992 | Schauder . | |
| 5,272,429 | 12/1993 | Lipo et al. | 318/808 |
| 5,294,876 | 3/1994 | Jonsson | 318/803 |
| 5,549,172 | 8/1996 | Mutoh et al. | 180/65.1 |
| 5,565,752 | 10/1996 | Jansen et al. | 318/807 |
| 5,585,709 | 12/1996 | Jansen et al. | 318/807 |

FOREIGN PATENT DOCUMENTS 2 664 837  1/1992  France .

OTHER PUBLICATIONS

John C. Salmon, et al. "A Split–Wound Induction Motor Design to Improve the Reliability of PWM Inverter Drives", IEE Transactions On Industry Applications, vol. 26, No. 1, Jan./Feb., 1990.

Patent Abstracts Of Japan, vol. 7, No. 255 (E–210), Nov. 12, 1983 JP–A–58 141656 (Tokyo Shibaura Denki KK), Aug. 23, 1983, Abridged.

*Primary Examiner*—Paul Ip
*Attorney, Agent, or Firm*—Oblon, Spivak, McClelland, Maier & Neustadt, P.C.

[57] ABSTRACT

The disclosure relates to a synchronous permanent-magnet electric motor and a vehicle driven by such a motor. The electric motor has a leakage inductance whose value is at least about 10% of the value of its effective inductance. In this way, the total inductance of the motor is maximized so as to optimize the effect of the variation of the phase of the stator current on the variation of the voltage at the terminals of the motor. The invention is notably applicable to an electric vehicle.

13 Claims, 2 Drawing Sheets

1

SYNCHRONOUS PERMANENT-MAGNET ELECTRIC MOTOR AND VEHICLE DRIVEN BY SUCH A MOTOR

BACKGROUND OF THE INVENTION

The invention relates to an electric motor and a vehicle driven by an electric motor.

It concerns in particular a vehicle drawing its energy from a bank of accumulators supplying power to the traction motor via an undulator, this electric motor being of the synchronous permanent-magnet type.

Such a traction system generally satisfies the requirements imposed for the production of electric cars for the general public, namely reasonable cost, small size and weight and optimal efficiency.

DESCRIPTION OF THE PRIOR ART

We recall here that a synchronous permanent-magnet motor includes, first, a rotor constituted by one or more permanent magnets and, secondly, a wound stator generally having three phases each fed with an alternating current. These currents, whose phases differ by 120° relative to each other, generate a rotating field that causes rotation of the rotor in synchronism with the rotation of this field.

The alternating currents of the phases of the stator are produced by an undulator including pairs of controlled switches, with one pair for each phase of the stator. In each pair, the switches are in series and each pair of switches in series is in parallel with the bank of accumulators. The point common to two controlled switches in series is connected to the phase of the stator associated with the pair of switches.

The control of the switches is such that at all times a single switch in each pair is conducting and, in absolute value, the current in a phase is equal to the sum of the currents in the two other phases (in the case of a star-mounted 3-phase stator).

To obtain a sinusoidal variation of the currents in each phase, we divide each cycle of this desired sinusoidal current into several sub-periods of equal duration. The number of sequences is 6, for example. During each of these sub-periods, the average current in the corresponding switch, and therefore in the associated phase, is constant.

For an electric vehicle, the control must, in general, be such that at low speed, for example from 0 to 2,000 rpm, the torque generated by the motor is substantially constant in order to provide a high torque when starting. Then, at higher speed, it is the power that should remain constant.

These constraints imposed on the drive motor, naturally impose constraints on the undulator and the control electronics. To minimize the cost and the size of the undulator, it is essential to minimize the constraints imposed on it.

For this reason, it is preferable that the undulator supplies, over the constant-power regimes of the motor, a substantially constant voltage and current. However, this requirement is incompatible with the properties of synchronous permanent-magnet type motors, since in these motors, the off-load electromotive force (e.m.f.) is proportional to the speed of rotation. Therefore when the speed of rotation increases, the back e.m.f. of the motor also increases, which means that it is necessary to increase the voltage supplied by the undulator and therefore to reduce the current supplied (at constant power the current must drop when the voltage increases).

To resolve this contradiction, the switches of the undulator are controlled so that, when the motor is fed at constant power, the supply voltage is maintained substantially constant by the regulation of the phase of the stator currents (relative to the position of the rotor).

Given that the supply voltage is the vector sum of the back e.m.f. and the voltage at the limits of the impedance constituted by the motor, we see that the value of this voltage depends on the amplitude and, above all, the phase of the current passing through the impedance.

The behavior of the synchronous motor and its power supply can also be explained as follows: the control (regulation) of the phase of the stator current corresponds to the control (regulation) of the magnetic flux in the machine. In effect, the current has two components, an active component that generates the torque, and the other defluxing, i.e. directly opposing the flux of the rotor magnet. Thus, at high speed, when the back e.m.f. is large, the phase of the stator currents is regulated so as to create a defluxing component opposing the back e.m.f., which enables a constant voltage to be maintained.

The efficiency of this control is higher when the motor has a high inductance.

SUMMARY OF THE INVENTION

According to the invention, a large value is given to this inductance by assuring a large value of the leakage inductance.

The value of the leakage inductance is, in the preferred embodiment, at least about 10%, and preferably at least 15%, of that of the effective inductance of the motor. In another embodiment, the value of the leakage inductance is about one third of the effective inductance.

In addition to its function of increasing the efficiency of the control, a high leakage inductance Lf (which, electrically, is in series with the motor) constitutes a filter that attenuates the harmonic currents acting on the rotor.

In this manner, we minimize the heating due to eddy currents generated in the magnets of the rotor by the harmonics (which also produce non-synchronous fields). This advantage is particularly appreciable when NeFeB magnets are used since these tend to demagnetized when they are heated to a temperature of around 180° C.

In a preferred embodiment, a high leakage inductance is achieved by the configuration of the slots in the stator that house the windings.

These slots have openings into the air gap and have, at this point, a narrow section of height h (the height being the dimension in the radial direction, from the air gap towards the bottom of the slot) and width b (dimension in the tangential direction) that determines the value of the leakage inductance. This leakage inductance is proportional to h/b. Preferably, the ratio h/b is greater than 0.5.

In one embodiment, this ratio h/b is about 0.9.

It is preferable that the width b of the slot be small in order to obtain a reduction of the currents induced in surface of the rotor and therefore a reduction of the superficial heating of the magnet of this rotor.

BRIEF DESCRIPTION OF THE DRAWINGS

The invention will be better understood and other advantages and characteristics will become clear on reading the following description of an embodiment, taken only as a non-limitative example, making reference to the appended figures, of which.

Figure 1:
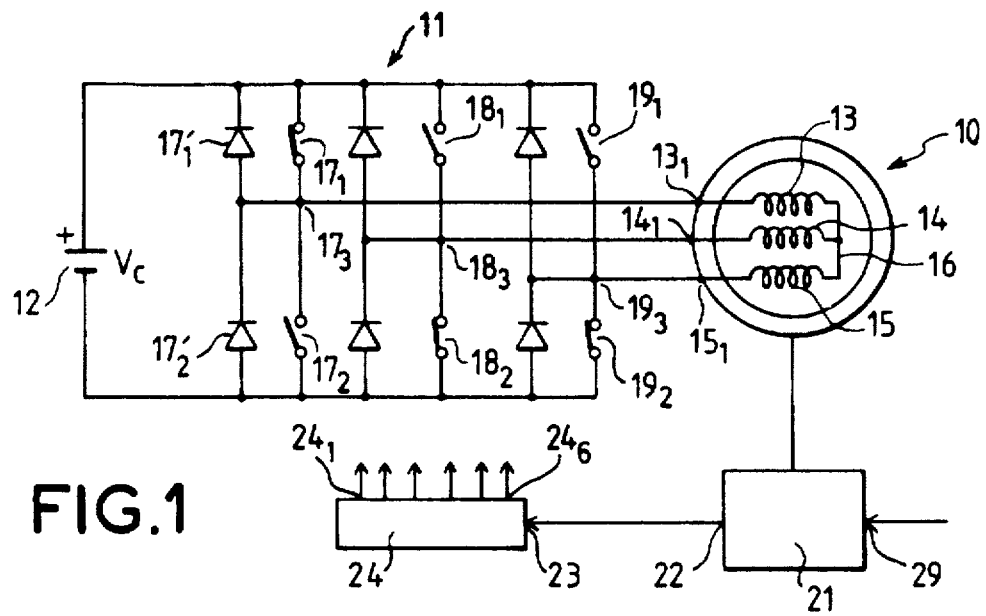
FIG. 1 is a schema of a synchronous electric motor, showing its undulator and associated control circuits.

The synchronous electric motor 10 assembly (FIG. 1), and its voltage undulator 11, that we shall describe with reference to figures, is designed to drive an "electric car" type vehicle drawing its power from a bank of accumulators 12.

The synchronous-type motor 10 includes, as usual, a rotor made up of permanent magnets (not shown in FIG. 1) and a 3-phase stator having three windings or phases, respectively 13, 14 and 15. In this example, the phases 13, 14, 15 are connected star-fashion, in other words they have a common connection 16.

These phases 13, 14 and 15 are fed with alternating current by the undulator 11. The function of the undulator is to supply alternating currents of 120° phase difference to the three phases 13, 14 and 15. This alternating current supply and the phase differences enable a rotating magnetic field to be generated that causes rotation of the rotor.

The voltage undulator 11 includes, in a known manner, six controlled switches divided into three pairs, respectively $17_1$ and $17_2$, $18_1$ and $18_2$, $19_1$ and $19_2$. In each of these pairs the two switches, $17_1$, $17_2$ for example, are in series. The common connector $17_3$ of the switches $17_1$, $17_2$ connected in series is connected to the terminal $13_1$ of the corresponding phase 13 at the opposite end of the winding from the terminal limit 16. Similarly, the connectors $18_3$ and $19_3$ are respectively connected to the terminals $14_1$ and $15_1$ of the phases 14 and 15.

A diode $17'_1$, $17'_2$, etc. is connected in parallel with each of the switches $17_1$, $17_2$, etc.

A sensor circuit 21 provides at all times a signal indicating the position of the rotor relative to the stator. For example, during each revolution the sensor of the circuit 21 produces six pulses such that successive pulses correspond to positions with angular separations of 60°. The output 22 of the circuit 21 is connected to the input 23 of a circuit 24 controlling the switches 17, 18, 19. The device 24 has six outputs 241 to 246 assigned to the control of the switches. For example, the output 241 controls the conduction of the switch $17_1$.

In the example, the switches 17, 18 and 19 are power transistors. In a variant, these switches are thyristors associated with forced switching circuits or GTO thyristors (gate turn-off thyristors).

Figure 2:
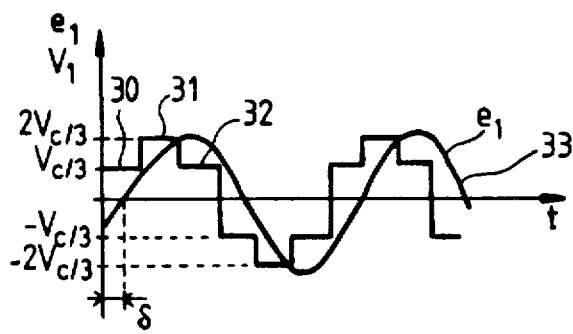
FIG. 2 is a graph corresponding to the operation of the device of FIG. 1.

In the graph in FIG. 2 the abscissa is the time and the ordinate is the voltage V1 at the terminal of the phase 13 of the stator of the motor 10, and also the back e.m.f. e1 of the motor 10 for this same phase 13.

The control of the switches is such that, at any time, a single switch is closed in each pair, and among the three closed switches only one is directly connected to the positive terminal of the battery 12, whereas the two other switches are connected to the negative terminal of this same battery. In the example in FIG. 1, the switches $17_1$, $18_2$ and $19_2$ are closed. In these conditions, the current flowing in the phase 13 is equal to the sum of the currents flowing in phases 14 and 15.

Therefore, the voltage V1 at the terminals of each of the phases, for example that of phase 13, successively takes the values ⅓ Vc, ⅔ Vc, −⅓ Vc and −⅔ Vc, depending on the closing sequence of the switches. This sequence of closing of the switches is such that it applies the required alternating voltages to the terminals of each phase 13, 14, 15. For this purpose, each half-cycle includes three levels. For example, the first half-cycle of the signal V1 (FIG. 2) includes a first level 30 of voltage ⅓ Vc, a second level 31 of ⅔ Vc and a third level 32 of ⅓ Vc.

When we wish to modulate (vary) the voltage at the limits of the windings of the stator of the motor, we trigger each level by means of a pulse-width modulation (not shown). Such a modulation consists in controlling the conduction of each switch at high frequency. During each of the chopping periods, of duration T, the corresponding switch is conducting for a time t that is a function of the desired current (or voltage). In other words, the cyclic ratio t/T determines the current that traverses the corresponding winding.

Moreover, we see in FIG. 2 that the back e.m.f. e1, represented by the sinusoidal curve 33, is out of phase by an amount δ relative to the voltage V1. This value δ can be controlled by a signal applied to an input 29 of the circuit 21.

The control of the motor 10 is such as the motor maintains is synchronism at all times. In other words, the speed of the rotating field is being constantly adapted to the speed of rotation of the rotor, thanks to the sensor of the circuit 21.

Figure 3:
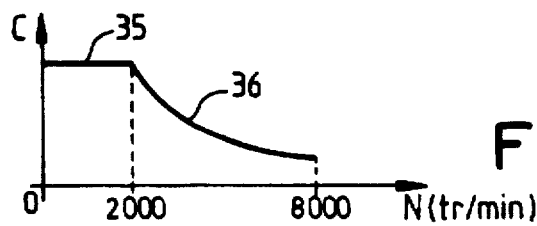
FIGS. 3 and 4 are graphs relating to the motor in FIG. 1.

Since the motor 10 is intended for the traction of an electric vehicle, it must provide the highest possible staring torque C that must be maintained up to a determined rotational speed. In the example shown in the graph of FIG. 3, in which the abscissa is the speed N of rotation of the motor (in rpm) and the ordinate is the torque C of the motor, the torque C is constant for speeds between 0 and 2,000 rpm. This characteristic is represented by the horizontal segment 35. Then, for speeds greater than 2,000 rpm, the torque diminishes, as represented by the curve 36 in FIG. 3.

On the other hand, for the speeds greater than 2,000 rpm, the power P of the motor is maintained at a constant value. This characteristic is represented by the horizontal segment 40 in FIG. 4. For starting speeds between 0 and 2,000 rpm, the power is proportional to the speed of rotation, as represented by the inclined segment 41 in FIG. 4.

To obtain these characteristics, between 0 and 2,000 rpm, the pulse-width modulation mentioned above is such that the cyclic ratio varies from a minimum value, for example ½, to a maximum value, for example 1. Then, for speeds above 2,000 rpm, the cyclic ratio remains constant at its maximum value. If the maximum value is 1, the pulse-width modulation no longer has any effect since the current flows permanently at each level in the corresponding switch.

To optimize the tailoring of the undulator 11, in order to minimize its cost, it is preferable that this undulator supplies voltage and current amplitudes that are substantially constant as the speed varies.

Figure 4:
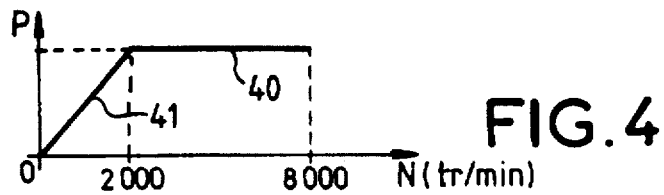

However this constraint is incompatible with the operation at constant power (segment 40 in FIG. 4). In effect, the voltage supplied by the undulator 11 must notably oppose the back e.m.f. of the motor 10, which is proportional to the speed of rotation. Consequently, when the speed increases, the voltage supplied by the undulator must also increase and the current must drop, since the power is constant.

Figure 5:
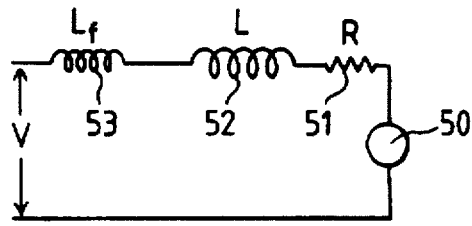
FIG. 5 is a circuit diagram of the motor in FIG. 1.
Figure 6:
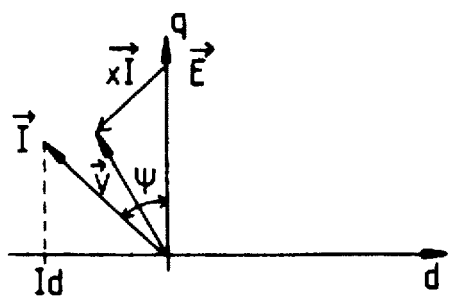
FIG. 6 is a diagram illustrating the operation of the device according to the invention.

To keep the voltage and current amplitudes supplied by the undulator substantially constant, we control the phase of the current in the windings of the stator so as to produce a magnetic flux that opposes the flux of the magnet. FIGS. 5 and 6 illustrate this approach.

FIG. 5 is a circuit diagram of the motor. Item 50 represents the motor at whose terminals appears the back e.m.f. e. Item 51 is its internal resistance; item 52 is its self-inductance; item 53 is the leakage inductance.

The voltage $\bar{V}$ at the terminals of the motor obeys the following equation:

$$\bar{V}=\bar{E}+X\bar{I}=\bar{E}+(R+jL\omega+jL_f\omega)\bar{I} \qquad (1)$$

In this formula, $\bar{V}$ is the voltage supplied to the motor, $\bar{E}$ is its back e.m.f., $\bar{I}$ is the current, X the impedance, R, L and Lf the respective values of the items 51, 52 and 53; $\omega=2\pi f$, where f is the frequency of the alternating current, and j is a complex number such that $j^2=-1$.

The internal resistance of the motor is, in general, negligible compared with the other items constituting the impedance. Therefore, in practice, the impedance is inductive only.

The formula (1) is represented by the vector diagram in FIG. 6, in which the axis d represents the magnetic axis of the rotor and the perpendicular axis represents the direction q said to be "in quadrature". At all times, the electric field E, and therefore the back e.m.f., is perpendicular to the axis of the magnets. The current $\bar{I}$ is out of phase by $\psi$ relative to the axis q, and the component $X\bar{I}$, which is inductive, is perpendicular to the vector current $\bar{I}$.

The component Id of the vector current $\bar{I}$ along the d axis generates a defluxing field, whereas the component of this vector current along the q axis generates an active component that generates the torque.

The component Id along the d axis therefore produces a flux that opposes the flux of the magnet and that induces a voltage that opposes the back e.m.f.. This component Id of course varies with the angle $\psi$.

In this way, we can regulate to maintain the current I and the amplitude V of the voltage substantially constant. The regulating parameter is the phase angle $\psi$ of the current.

Although the defluxing current is useful to control the machine, it is nevertheless useful to minimize it so as to optimize the yield.

For this optimization, we can maximize the inductance of the motor because, for a given product $X\bar{I}$, the defluxing current $\bar{I}$ diminishes as X increases.

According to the invention, to give a higher inductance to the motor, we configure the motor such that its leakage inductance is high relative to its effective inductance. This leakage inductance is at least 10% to 15% of the effective inductance and preferably about one third. We recall here that the leakage inductance is the inductance corresponding to the flux leakage relative to the rotor, in other words to the flux that is not enclosed within the rotor/stator air gap.

Figure 7:
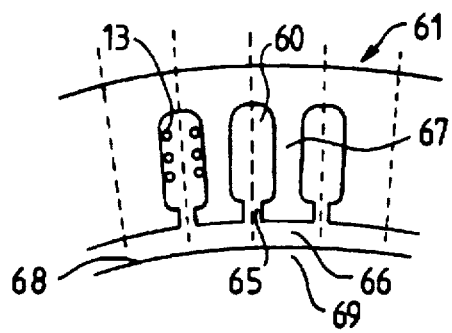
FIG. 7 is a diagram of part of the stator of the motor according to the invention.

The leakage inductance of a synchronous motor depends, to a large extent, on the geometry of the slots 60 (FIG. 7) of the stator 61. These slots house the windings or phases 13, 14, 15. Each of these slots 60 has an opening 65 into the air gap 66 between the poles 67 of the stator and the periphery 68 of the rotor 69.

Figure 8:
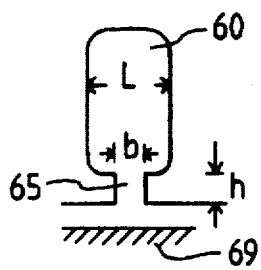
FIG. 8 is an enlarged view of part of FIG. 7.

In general, this opening 65 has a width b that is smaller than the main width L of the slot 60 (FIG. 8). By width b, we means the dimension in the direction tangential to the rotor. This narrowing over the height h that is relatively short compared with the overall height of the slot (by "height", we mean the dimension in the radial direction).

The leakage inductances are proportional to the ratio h/b. In an example, this ratio h/b is greater than 0.5 and preferably about 0.9.

The presence of a relatively high leakage inductance also enables a substantial reduction of the heating of the rotor by eddy currents. These eddy currents are due to field harmonics that are not in synchronization with the rotation of the rotor. These harmonics, which originate from the chopping control of the undulator, are attenuated by the leakage inductance.

Generally speaking, we see that it is useful to increase the leakage inductance, reduce the width b and increase the height h.

Reduction of the width b also has a further advantageous effect: the reduction in the superficial heating of the rotor. The reason is that when the width is small the currents induced in surface of the rotor, by induction wave, will also be small. This diminution of the heating is a major advantage, notably when temperature-sensitive magnets are used, such as rare-earth magnets of the neodymium-iron-boron (NeFeB) type that tend to demagnetize at temperatures of about 180° C.

Figure 9:
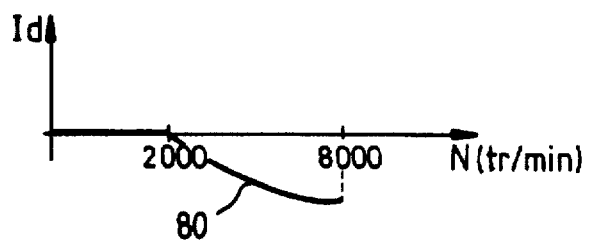
FIGS. 9 and 10 are diagrams illustrating the operation of the device according to the invention.

FIG. 9 is a graph in which the abscissa is the speed of rotation N of the motor in rpm and the ordinate is the defluxing current Id. As we can see, this defluxing current is zero from 0 to 2,000 rpm and has a negative value (curve 80) at higher speeds.

Figure 10:
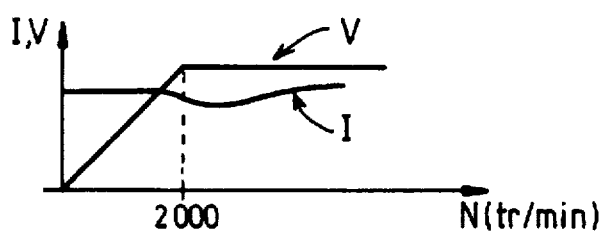

FIG. 10 is a graph in which the abscissa is the motor speed N in rpm and the ordinate is the voltage V and the current I. On this curve, we see that the voltage V increases from 0 to 2,000 rpm and remains constant at higher speeds. The current I flowing in the motor is not strictly constant, but its variations do not impose any major constraint on the undulator.

What is claimed is:

1. A synchronous electric motor, having a back electromotive force, comprising a rotor of one or more permanent magnets and a wound stator, said motor having a leakage inductance value of at least approximately 10% of the effective inductance of the motor, such that the total inductance of said motor is maximized, so as to minimize at high speed, a defluxing component of stator currents, said defluxing component opposing said back electromotive force, in order to keep a substantially constant voltage at terminals of the motor.

2. Motor according to claim 1, wherein said leakage inductance is about one third of the effective inductance.

3. Motor according to claim 1, wherein its stator has slots that house the windings, each of these slots having a opening into the air gap that is narrowed over a height h (dimension in the radial direction), the ratio between this height h and the width b (in the direction tangential to said rotor) of said opening being greater than 0.5.

4. Motor according to claim 3, wherein said ratio h/b is about 0.9.

5. Motor according to claim 1, wherein said rotor includes a neodymium-iron-boron permanent magnet.

6. A motor according to claim 1, wherein said leakage inductance is at least 15% of the effective inductance of the motor.

7. A vehicle driven by a synchronous-type electric motor having a rotor of permanent magnets and a wound stator fed by alternating currents generating a rotating field, a control circuit controlling the phase of the alternating current in the stator in order that the voltage supplied to said motor remains constant when the power supplied to said motor is constant, wherein to optimize the efficiency of the phase control, the motor has a leakage inductance value of at least approximately 10% of the effective inductance of the motor.

8. Vehicle according to claim 7, wherein the power supply of the windings of the stator is provided by means of a voltage undulator that transforms the DC voltage supplied by a bank of accumulators into a multi-phase alternating current, the switches of this undulator being controlled by means of a sensor detecting the position of the rotor, the phase of the alternating current of the stator being determined relative to the rotor.

9. Vehicle according to claim 7, wherein when starting, and up to a determined speed of rotation, the motor torque is constant and, above said determined speed, the motor power is constant.

10. Vehicle according to claim 9, wherein said determined speed is about 2,000 rpm.

11. Vehicle according to claim 8, wherein said control of said switches of said undulator is such that the frequency of the alternating currents feeding the motor are adapted to the operation of the motor in order that it conserves its synchronism at all times.

12. Vehicle according to claim 8, wherein said controlled switches are transistors or thyristors.

13. A vehicle according to claim 7, wherein said motor leakage inductance is at least 15% of the effective inductance of the motor.

* * * * *